(12) United States Patent
Peltz et al.

(10) Patent No.: US 11,883,832 B2
(45) Date of Patent: Jan. 30, 2024

(54) RELEASABLE DUST MITIGATION COVERING

(71) Applicant: The Boeing Company, Chicago, IL (US)

(72) Inventors: Leora Peltz, Pasadena, CA (US); Kavya K. Manyapu, Friendswood, TX (US)

(73) Assignee: The Boeing Company, Arlington, VA (US)

( * ) Notice: Subject to any disclaimer, the term of this patent is extended or adjusted under 35 U.S.C. 154(b) by 267 days.

(21) Appl. No.: 16/941,687

(22) Filed: Jul. 29, 2020

(65) Prior Publication Data

US 2021/0291198 A1 Sep. 23, 2021

Related U.S. Application Data

(60) Provisional application No. 62/990,830, filed on Mar. 17, 2020.

(51) Int. Cl.

| | |
|---|---|
| *B03C 3/017* | (2006.01) |
| *B03C 3/32* | (2006.01) |
| *B03C 3/47* | (2006.01) |
| *B64G 1/52* | (2006.01) |
| *B64G 6/00* | (2006.01) |

(Continued)

(52) U.S. Cl.
CPC .............. *B03C 3/017* (2013.01); *B03C 3/32* (2013.01); *B03C 3/47* (2013.01); *B64G 1/52* (2013.01); *B64G 6/00* (2013.01); *D03D 1/0088* (2013.01); *D03D 15/533* (2021.01); *D10B 2401/16* (2013.01); *D10B 2501/04* (2013.01)

(58) Field of Classification Search
None
See application file for complete search history.

(56) References Cited

U.S. PATENT DOCUMENTS

| 10,016,766 | B2 | 7/2018 | Manyapu et al. | |
|---|---|---|---|---|
| 2014/0261536 | A1* | 9/2014 | Buhler | B08B 17/06 134/1 |

(Continued)

FOREIGN PATENT DOCUMENTS

| CN | 101364139 A | 2/2009 |
|---|---|---|
| CN | 101646499 A | 2/2010 |

(Continued)

OTHER PUBLICATIONS

International Search Report and Written Opinion for PCT/US2021/021539 dated Jun. 24, 2021.

(Continued)

*Primary Examiner* — Shawn Mckinnon
(74) *Attorney, Agent, or Firm* — McDonnell Boehnen Hulbert & Berghoff LLP

(57) ABSTRACT

A covering includes an outer material, a plurality of conductive-fibers, and a fastening material. The outer material includes a front surface and a back surface and the conductive-fibers are disposed between the front surface and the back surface. The conductive-fibers are configured to receive a voltage that causes the conductive-fibers to repel and remove dust from the front surface of the outer material. The fastening material is coupled to the back surface of the outer material and facilitates releasably attaching the outer material to an article.

21 Claims, 11 Drawing Sheets

(51) Int. Cl.
*D03D 15/00* (2021.01)
*D03D 1/00* (2006.01)
*D03D 15/533* (2021.01)

(56) References Cited

U.S. PATENT DOCUMENTS

2017/0274390 A1  9/2017  Manyapu et al.
2018/0281338 A1  10/2018  Manyapu et al.
2019/0177011 A1  6/2019  Manyapu et al.

FOREIGN PATENT DOCUMENTS

| | | |
|---|---|---|
| CN | 203300671 U | 11/2013 |
| CN | 106540929 A | 3/2017 |
| CN | 207839568 U | 9/2018 |
| CN | 108 941 144 A | 12/2018 |
| GB | 2557370 A | 6/2018 |
| WO | WO2017/143268 A1 | 8/2017 |

OTHER PUBLICATIONS

First Notification of Office Action issued by the Chinese Patent Office in Application No. 202180021353.8 dated Sep. 23, 2023. (English translation included).

* cited by examiner

RELEASABLE DUST MITIGATION COVERING

RELATED APPLICATIONS

This application claims priority under 35 U.S.C. § 119 to U.S. Provisional Patent Application No. 62/990,830, filed Mar. 17, 2020, the contents of which are hereby incorporated by reference in their entirety.

BACKGROUND

Field

This application generally relates to dust mitigation. In particular, this application describes a releasable dust mitigation covering.

Description of Related Art

The presence of dust or dust-like particles can cause problems in some types of equipment. For example, the dust can interfere with electronic circuits by lowering the impedance or producing capacitive coupling between electrical nodes of the electronic circuits. Dust can accumulate on ventilation intakes, which can lead to reduced ventilation. These types of problems tend to be exacerbated in very dusty/dry environments. For example, fine particles of sand blowing in a dust storm can interfere with the operation of equipment.

Problems with dust can be experienced in non-terrestrial environments. For example, the lunar surface is covered with fine particles of so-called lunar dust. NASA Apollo astronauts reported that this dust had caused several anomalies during the Apollo missions because of the lunar dust's strong tendency to collect on, adhere to, or otherwise contaminate the surface of equipment that was utilized in extravehicular activity (EVA) operations. For example, the dust rapidly degraded spacesuits. The dust clogged sensor inlets on equipment, causing false instrument readings.

SUMMARY

In a first aspect, a covering includes an outer material, a plurality of conductive-fibers, and a fastening material. The outer material includes a front surface and a back surface, and the conductive-fibers are disposed between the front surface and the back surface. The conductive-fibers are configured to receive a voltage that causes the conductive-fibers to repel and remove dust from the front surface of the outer material. The fastening material is coupled to the back surface of the outer material and facilitates releasably attaching the outer material to an article.

In a second aspect, a covering includes an outer material, a plurality of conductive-fibers, and one or more button-snaps. The outer material includes a front surface and a back surface. The plurality of conductive-fibers are disposed between the front surface and the back surface. The plurality of conductive-fibers are configured to receive a voltage that causes the conductive-fibers to repel dust from the front surface of the outer material. The one or more button-snaps are coupled to the outer material and facilitate releasably attaching the outer material to an article.

In a third aspect, a method for repelling dust from an article includes communicating a voltage to a plurality of conductive-fibers arranged between a front surface and a back surface of an outer material of a covering. The voltage is configured to cause the conductive-fibers to repel and remove dust from the front surface of the outer material. The method further includes attaching the covering to the article via a fastening material arranged on a back surface of the outer material that facilitates releasably attaching the covering to the article.

BRIEF DESCRIPTION OF THE DRAWINGS

The accompanying drawings are included to provide a further understanding of the claims, are incorporated in, and constitute a part of this specification. The detailed description and illustrated examples described serve to explain the principles defined by the claims.

DETAILED DESCRIPTION

Figure 1A:
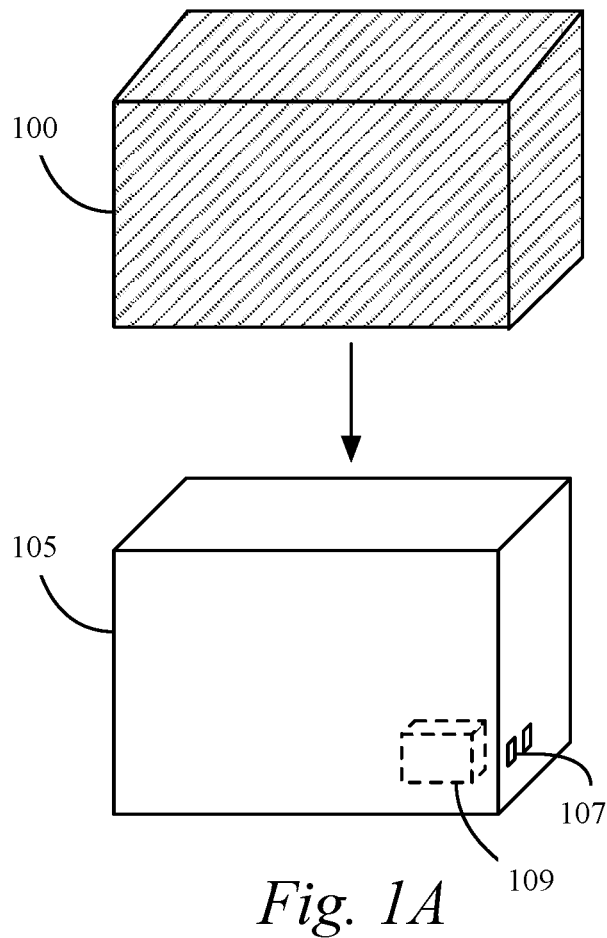
FIG. 1A illustrates a covering configured to cover or blanket an article, in accordance with an example.

Various examples of systems, devices, and/or methods are described herein. Words such as "example" and "exemplary" that may be used herein are understood to mean "serving as an example, instance, or illustration." Any embodiment, implementation, and/or feature described herein as being an "example" or "exemplary" is not necessarily to be construed as preferred or advantageous over any other embodiment, implementation, and/or feature unless stated as such. Thus, other embodiments, implementations, and/or features may be utilized, and other changes may be made without departing from the scope of the subject matter presented herein.

Accordingly, the examples described herein are not meant to be limiting. It will be readily understood that the aspects of the present disclosure, as generally described herein, and illustrated in the figures, can be arranged, substituted, combined, separated, and designed in a wide variety of different configurations.

Further, unless the context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Moreover, terms such as "substantially," or "about" that may be used herein, are meant that the recited characteristic, parameter, or value need not be achieved exactly, but that deviations or variations, including, for example, tolerances, measurement error, measurement accuracy limitations and other factors known to skill in the art, may occur in amounts that do not preclude the effect the characteristic was intended to provide.

To the extent that terms "includes," "including," "has," "contains," and variants thereof are used herein, such terms are intended to be inclusive in a manner similar to the term "comprises" as an open transition word without precluding any additional or other elements.

I. Introduction

A dust mitigation system (DMS) and method of using the DMS are disclosed. An example of the DMS corresponds to a covering or patch that is configured to cover a specific area of an article or to blanket the article. Generally, the covering corresponds to a patch or similar item suitable for patching an article (e.g., the elbow region or knee region of a suit, such as a workman's suit, a spacesuit) or a tarp, blanket, or similar item suitable for blanketing an article (e.g., industrial/factory equipment, lunar or Martian equipment). The article corresponds to any item to be patched and/or covered. In the context of this application, these items include space equipment that is left for a period on a moon, planet, asteroid, etc., where dust may be present and may otherwise interfere with the operation of the equipment. Some examples of the covering are configured to be wrapped around an article such as equipment/hardware to prevent dust accumulation thereon. This facilitates leaving the equipment/hardware on the surface of, for example, the moon for extended periods of time.

An example of the covering is applied to areas of a spacesuit that would ordinarily be expected to attract dust (e.g., lunar dust, Martian dust, asteroid dust, Earth dust, etc.). In these examples, the covering corresponds to patches that cover elbows, knees, chins, etc. As described in further detail below, an example of the covering is releasably attachable to a particular area. This facilitates the replacement of the covering when the covering is no longer required or functional, which may occur with wear and tear. It should be appreciated that in other examples, the covering can be applied to other non-wearable objects and equipment.

Figure 1B:
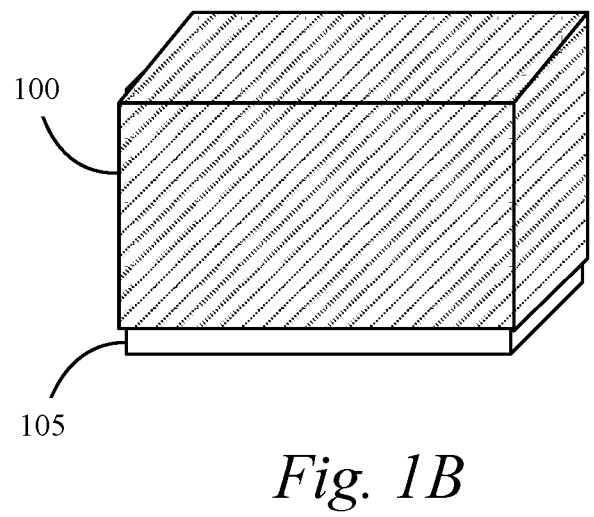
FIG. 1B illustrates the covering of FIG. 1A blanketing the article, in accordance with an example.
Figure 1C:
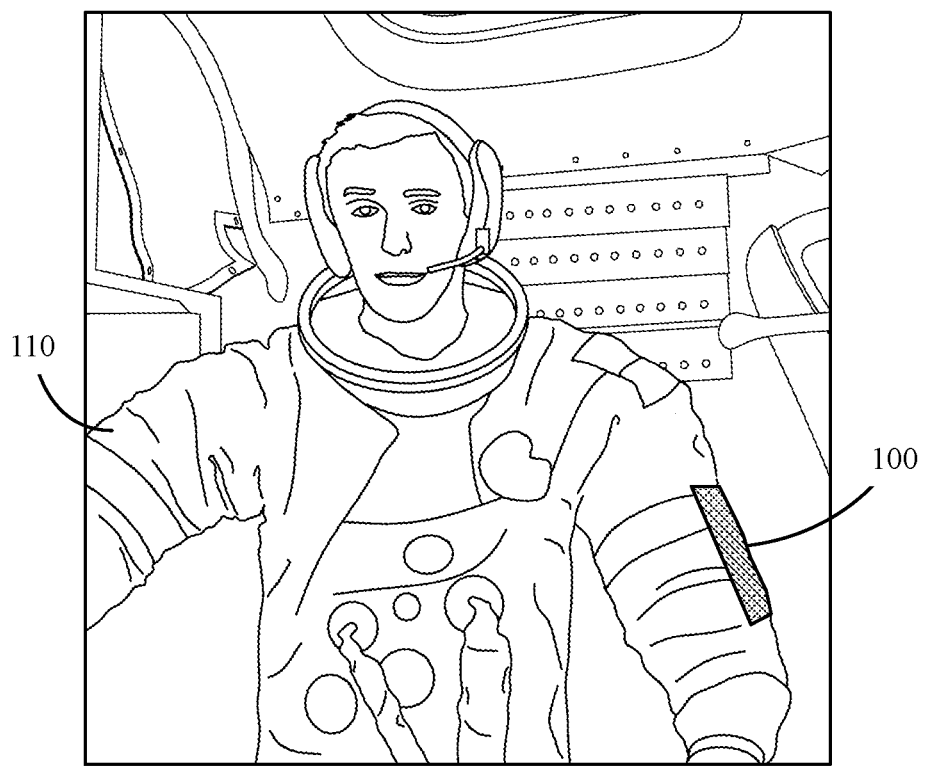
FIG. 1C illustrates a covering that corresponds to a patch for covering a region of a spacesuit, in accordance with an example.

FIG. 1A illustrates an example of a covering 100 configured to cover or blanket an article 105. FIG. 1B illustrates the covering 100 blanketing the article 105. FIG. 1C illustrates an example of a covering 100 that corresponds to a patch for covering a region of, for example, a spacesuit 110. As will be described in more detail below, when the covering 100 is applied over the article 105, an electrical current is applied to conductive-fibers 215 within the covering 100. The electrical current generates an electromagnetic wave that travels over the surface of the covering 100 and repels particles, such as dust particles. In an example, the covering 100 is customizable to the specific geometry of the article 105 being covered where dust protection is required. For example, a box-shaped covering 100 can be used to cover an article 105 having the shape of a box. A cylindrical-shaped covering 100 can be used to cover an article 105 having the shape of a cylinder (e.g., covering the knee or elbow joint of a spacesuit). A patch shaped covering 100 can be used to cover a specific region of an article 105, such as the elbow region or knee region of spacesuit 110. Examples of the coverings 100 include a fastening material that facilitates releasable attaching or fixing the covering 100 to an article 105. In some examples, the fastening material is arranged or configured to fasten a portion of the covering 100 to the article 105 (e.g., a bottom edge of the opening of a covering arranged over a box). In some examples, the fastening material is arranged or configured to fasten a portion of the covering 110 that includes electrical couplers to corresponding electrical couplers of an article to facilitate providing power from the article to circuitry on the covering 110 for repelling dust.

Figure 2A:
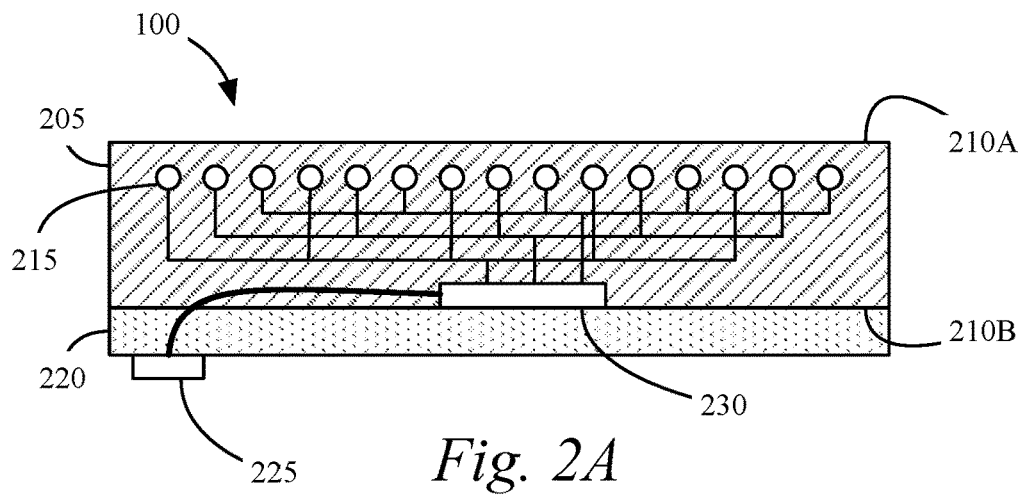
FIG. 2A illustrates a cross-section of the covering, in accordance with an example.
Figure 2B:
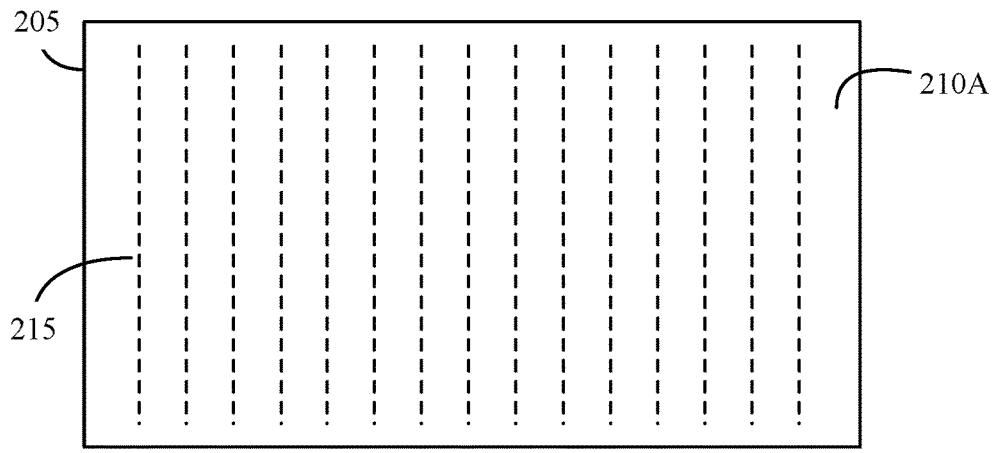
FIG. 2B illustrates a top/outside view of the cross-section of the covering, in accordance with an example.
Figure 2C:
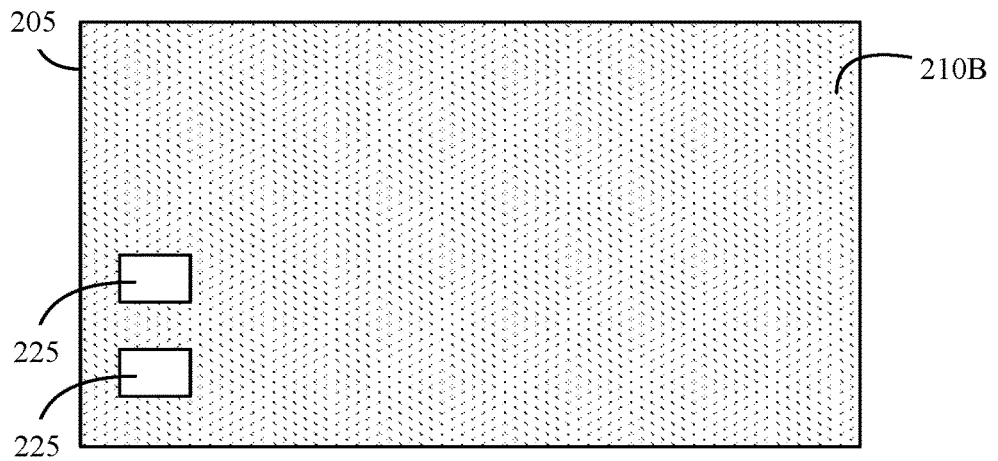
FIG. 2C illustrates a bottom/inside view of the cross-section of the covering, in accordance with an example.

FIG. 2A illustrates an example of a cross-section of the covering 100. FIG. 2B illustrates a top/outside view of the cross-section of the covering 100. FIG. 2C illustrates a bottom/inside view of the cross-section of the covering 100. The top-view illustrates the side of the covering 100 that, when in use, would be outward-facing from the article 105 covered by the covering 100. The dashed lines correspond to the conductive-fibers 215, which are buried within the outer material 205 and, therefore, not visible. The bottom-view illustrates the side of the covering 100 that, when in use, would face the article 105.

Referring to the figures, the covering 100 includes an outer material 205, a plurality of conductive-fibers 215, and a fastening material 220. The outer material 205 includes a front surface 210A and a back surface 210B, and the conductive-fibers 215 are disposed between the front surface 210A and the back surface 210B. As described below, the conductive-fibers 215 are configured to receive a voltage that causes the conductive-fibers 215 to repel and remove dust from the front surface 210A of the outer material 205. That is, the voltage across the conductive-fibers 215 generates an electrostatic field around the conductive-fivers 215 that repels dust particles The fastening material 220 is coupled to the back surface 210B of the outer material 205 and facilitates releasably attaching the outer material 205 to an article 105. Additional details related to these aspects are described below.

An example of the outer material 205 is a fabric material, a rigid material, a flexible material, etc. An example of the fabric material corresponds to woven or braided material. An example of the fabric material corresponds to Ortho-Fabric that can be utilized for the outer of a spacesuit and which includes a complex weave blend of GORE-TEX® (i.e., a synthetic waterproof fabric-material that includes a membrane that is permeable to air and water vapor), KEVLAR® (i.e., poly-paraphenylene terephthalamide, a para-aramid synthetic fiber of high tensile strength), and NOMEX® (a flame-resistant meta-aramid synthetic fiber) materials.

In an example, the conductive-fibers 215 are embedded within or woven within the outer material 205. An example of a conductor utilized in the conductive-fibers 215 corresponds to a carbon nanotube (CNT). CNTs can be utilized where high strength and flexibility of the covering 100 are desired. An example of a CNT corresponds to allotropes of carbon with a cylindrical nanostructure that have a cylindrical structure with a diameter of about one nanometer, a length-to-diameter ratio up to about 132,000,000 to 1, high thermal conductivity (with a range of approximately 100 mWm2/kgK to 1000 mWm2/kgK), normalized electrical conductivity (with a range of approximately 1 kS m2/kg to 6 kS m2/kg, normalized by density), and high mechanical strength and stiffness (with a tensile strength in the approximate range of 1 GPa to 1.3 GPa). Another example of a conductor utilized in the conductive-fibers 215 corresponds to a metal conductor, such as copper, aluminum, etc.

In an example, the conductive-fibers 215 extends approximately parallel to one another in a first direction within the outer material 205. In an example, the conductive-fibers 215 are arranged in proximity and/or on the front surface 210A of the outer material 205. The conductive-fibers 215 are configured to receive an alternating-current (AC) voltage-signal from signal conditioning circuitry 230, described further below. When an alternating-current is applied to the plurality of conductive-fibers 215, an electric field is generated on the front surface 210A of the outer material 205. The phase of the AC voltage-signals is selected to create a traveling-wave of the electric-field that travels along the front surface 210A of the outer material 205 in a second direction that is approximately transverse to the first direction. By adjusting the phase of the AC voltage-signal or the slight divergence in the angle of the approximately parallel conductive-fibers 215, the approximate transverse angle of the second direction (i.e., the direction of the traveling-wave) can be adjusted from a transverse angle (i.e., 90 degrees) to a non-transverse angle that is still approximately transverse (i.e., approximately 90 degrees—for example approximately 80 degrees to approximately 220 degrees).

In an example, to repel dust particles having sizes between about 5 to 300 microns in lunar conditions, the width of the conductive-fibers 215 is configured to be between about 0.5 to 400 microns. In an example, the space between the conductive-fibers 215 is configured to be between about 0.3 to 4 mm. As described further below, in an example, the voltages applied to the conductive-fibers 215 are configured to be between about 200 to 2,000 Volts. In an example, the frequency of the voltages is between about 5 to 100 Hz. These parameters can be adjusted to facilitate repelling dust particles having different sizes and/or consistencies.

An example of the fastening material 220 corresponds to an adhesive, such as a pressure-sensitive adhesive (e.g., non-woven tape, which can stretch, is absorbent, can repel liquids, is flame retardant, etc.) or a structural adhesive (e.g., polyvinyl acetate (PVA) glue, epoxy, etc.). Another example of the fastening material 220 corresponds to a hook-and-loop material, such as Velcro®. The hook-and-loop material is configured to attach to a hook-and-loop material disposed on the article 105. Other examples of the fastening material 220 include zippers, hooks, snaps, buttons, magnets, elastic cord or band, etc. that facilitates fastening the covering 100 to another surface that includes complimentary zippers, hooks (or openings to receive hooks of fastening material 220), buttons, magnets (or ferrous material to which magnets of fastening material 220 is attracted). While the fastening material 220 is illustrated as overlaying the entire back surface 210B of the outer material 205, in some examples, the fastening material 220 is applied to specific regions of the back surface 210B of the outer material 205. For example, an example of the fastening material 220 is provided on the periphery of the back surface 210B of the outer material 205, central regions of the back surface 210B of the outer material 205, etc.

An example of the covering 100 includes signal conditioning circuitry 230 configured to apply voltages having different phases to the conductive-fibers 215 that causes the conductive-fibers 215 to repel dust. An example of the signal conditioning circuitry 230 is arranged on a flexible or rigid printed circuit board (PCB). An example of the signal conditioning circuitry 230 is configured to convert power received by the signal conditioning circuitry 230 to one or more voltages suitable for repelling dust from the outer material 205. In this regard, an example of the signal conditioning circuitry 230 generates alternating-current (AC) voltages that have a voltage between 200 Volts and 2000 Volts and a frequency of between 5 Hz and 100 Hz.

An example of a voltage generated by the signal conditioning circuitry 230 is a sinusoidal voltage or a square wave voltage. In other examples, the voltages generated by the signal conditioning circuitry 230 have a different time-varying shape such as a triangular shape, sawtooth shape, etc. Voltages having these shapes can, in some cases, cause more abrupt changes in the repelling nature of the voltage when applied to the conductive fibers that can improve dust repelling action.

As noted above, voltages of different phases are applied to adjacent conductive-fibers 215 by the signal conditioning circuitry 230. In this regard, an example of the signal conditioning circuitry 230 includes three outputs that generate time-varying voltages at three different phases. The outputs communicate voltages that are 120 degrees out-of-phase with one another. For example, a first output communicates a voltage that is 120 degrees out of phase with the voltage communicated from the second output. The second output communicates a voltage that is 120 degrees out of phase with the voltage communicated from the third output. The third output communicates a voltage that is 120 degrees out of phase with the voltage communicated from the first output. The first, second, and third outputs are respectively coupled to first, second, and third adjacent conductive-fibers 215. For example, consider a group of nine parallel conductive-fibers 215. The first output is coupled to the first, fourth, and seventh conductive-fibers 215. The second output is coupled to the second, fifth, and eight conductive-fibers 215. The third output is coupled to the third, sixth, and ninth conductive-fibers 215.

Some examples of the signal conditioning circuitry 230 include fault detection circuitry. It should be appreciated that prolonged usage and handling of the covering 100 can lead to one or more of the conductive-fibers 215 electrically opening or shorting. An example of the fault detection circuitry is configured to detect these issues and, therefore, facilitate determining the operational status or effectiveness of the covering 100.

One example of the fault detection circuitry is configured to measure the load on each output of the signal conditioning circuitry 230. For example, an example of the fault detection circuitry determines whether a particular conductive-fiber 215 or groups of conductive-fibers 215 are shorted with other conductive-fibers 215 or groups of conductive-fiber 215.

Another example of fault detection circuitry is configured to determine breaks/opens in one or more of the conductive-fibers 215 and or changes in impedance. For example, an example of the fault detection circuitry includes a time-domain-reflectometer (TDR). The TDR transmits an incident signal onto a particular conductive-fiber and listens for any reflections of the incident signal. In a properly functioning conductive-fiber 215, the reflection will cancel out with the incident signal and, therefore, no reflection will be detected. If there are impedance variations in the conductive-fiber 215 (e.g., an open), then some of the incident signal will be reflected back to the source. The timing of the reflection facilitates determining the distance down the conductive-fiber 215 where the fault is located. In some examples, the signal conditioning circuitry 230 includes a switch that facilitates sending the TDR incident signal down different conductive-fibers 215.

In some examples, upon detecting a fault, the fault detection circuitry disables the outputs of the signal conditioning circuitry 230 to avoid damage to the signal conditioning circuitry 230. In some examples, the fault detection circuitry communicates with a controller 600 (described below) to alert an operator to the fault condition.

An example of the covering 100 includes a pair of electrical contacts 225 for receiving power. The electrical contacts 225 facilitates the communication of power to the signal conditioning circuitry 230. In the illustrated example, the electrical contacts 225 are arranged on the fastening material 220. In other examples, the electrical contacts 225 are arranged on the front surface 210A of the outer material 205. Other placement combinations are possible.

In an example, the electrical contacts 225 correspond to electrical contact springs that resiliently couple to a corresponding pair of electrical contact pads arranged on a power source. The opposite configuration is contemplated as well. In another example, the electrical contacts 225 correspond to button snaps that are configured to snap/couple to a corresponding pair of snaps arranged on a power source. In another example, the electrical contacts 225 correspond to the male end of connector terminal configured to mate to a corresponding female end of a connector from which power is derived. In another example, the electrical contacts 225 include magnets that facilitate magnetically coupling the electrical contacts 225 to corresponding electrical contacts 225 of the power source. The opposite arrangement is possible.

In one example, the article 105 includes a power source 109 and electrical contacts 107 (e.g., contact pads, button snaps, connectors, etc.) configured to electrically couple to the electrical contacts 225 of the covering 100. In another example, a stand-alone power source, such as a battery or fuel cell, is utilized to provide power to the covering 100 via the electrical contacts 225.

Figure 3A:
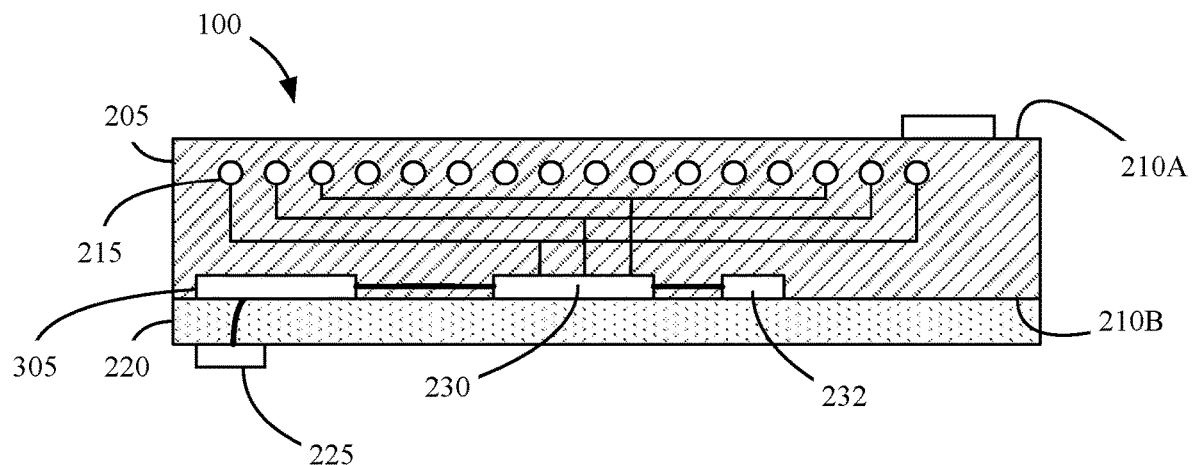
FIG. 3A illustrates a covering with an integrated power source, in accordance with an example.

FIG. 3A illustrates an example of a covering 100 with an integrated power source 305. An example of the integrated power source 305 is configured to operate in extreme environments (e.g., those that exist on the moon, on Mars and other planets or planetoids, or asteroids, etc.). Such environments may experience large temperature swings between day and night, there may be little to no atmosphere, solar radiation may be intense, etc. In an example, the integrated power source 305 corresponds to a rechargeable battery, such as a Lithium-Ion (LiIon) battery. The rechargeable battery can have a different chemistry and is within the scope of this disclosure.

In some examples, the rechargeable battery is recharged via the electrical contacts 225. For example, a direct current (DC) charger can be provided, and the charger includes electrical contacts configured to electrically couple to the electrical contacts 225 of the covering 100.

Figure 3B:
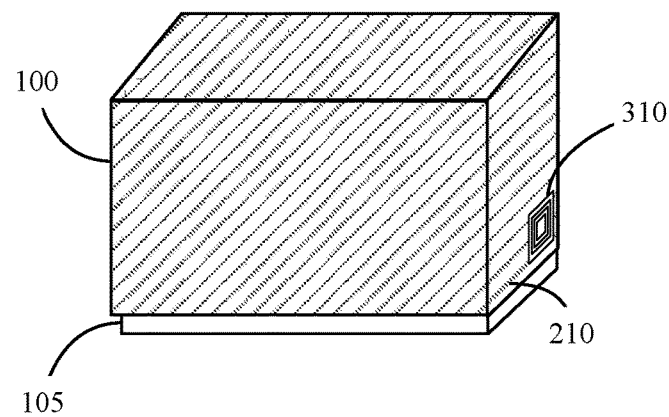
FIG. 3B illustrates a covering that includes wireless charging circuitry that facilitates recharging a rechargeable energy source of the covering, in accordance with an example.

Referring to FIG. 3B, some examples of the covering 100 include wireless charging circuitry 310 that facilitates recharging the rechargeable battery. For example, an example of the covering 100 includes energy receiving coils configured to receive energy from a wireless charging base. The wireless charging circuitry 310 is configured to convert energy received from the wireless charging base to a voltage suitable for charging the rechargeable battery and/or for providing power to the signal conditioning circuitry 230.

Figure 3C:
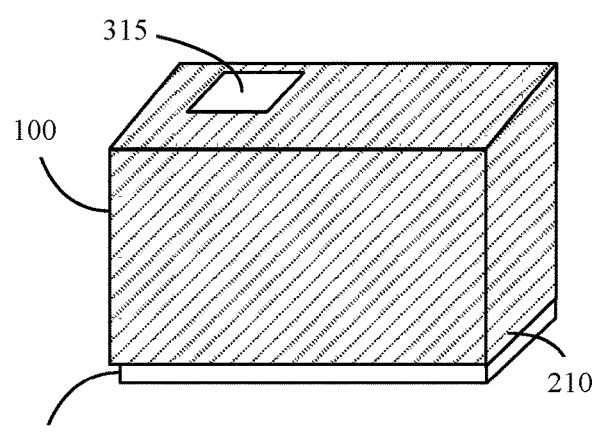
FIG. 3C illustrates a covering that includes a photovoltaic system that facilitates recharging a rechargeable energy source of the covering, in accordance with an example.

Referring to FIG. 3C, some examples of the covering 100 include a photovoltaic system 315 configured to generate power from sunlight. In an example, the photovoltaic system 315 includes a photovoltaic array of cells that is arranged on the front surface 210A (i.e., side facing sunlight or side facing a different source of light sufficient to cause the photovoltaic array to generate sufficient voltage) of the outer material 205. In some examples, the photovoltaic array of cells is arranged on a substrate, and the substrate is rigid or flexible. In some examples, the photovoltaic system 315 is utilized to recharge an integrated power source 305 (e.g., a rechargeable battery, capacitor, fuel cell, and/or other energy storage devices). Additionally, or alternatively, in some examples, the power for operating the signal conditioning circuitry 230 is derived directly from the photovoltaic system 315. In this case, an integrated power source 305 may not be required.

Figure 4:
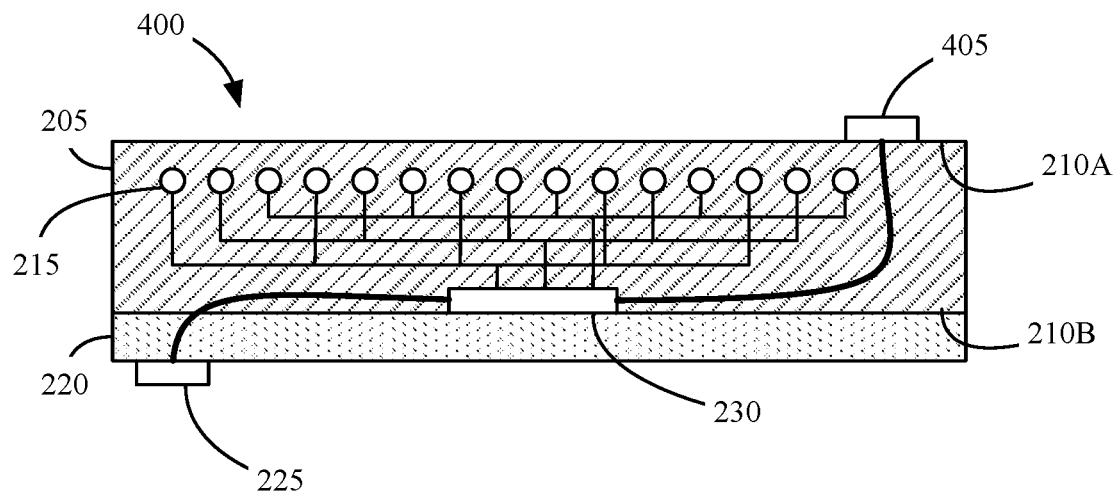
FIG. 4 illustrates a cross-section of a covering that includes a status indicator, in accordance with an example.

FIG. 4 illustrates an example of a cross-section of a covering 400 that includes a status indicator 405. Referring to the figure, an example of the status indicator 405 corresponds to a group of light-emitting diodes (LEDs), segments on a liquid crystal display (LCD), etc. The status indicator 405 is communicatively coupled to the signal conditioning circuitry 230 and configured to indicate an amount of damage detected by the signal conditioning circuitry 230, a percentage of usable conductive-fibers 215, etc. For example, an example of the status indicator 405 indicates a scale such as one to ten, where ten indicates that 100% of the conductive-fibers 215 are working properly (e.g., not broken or shorted, impedance has not degraded from nominal, etc.), five indicates that 50% of the conductive-fibers 215 are working, one indicates that only 10% of the conductive-fibers 215 are working, etc.

Figure 5:
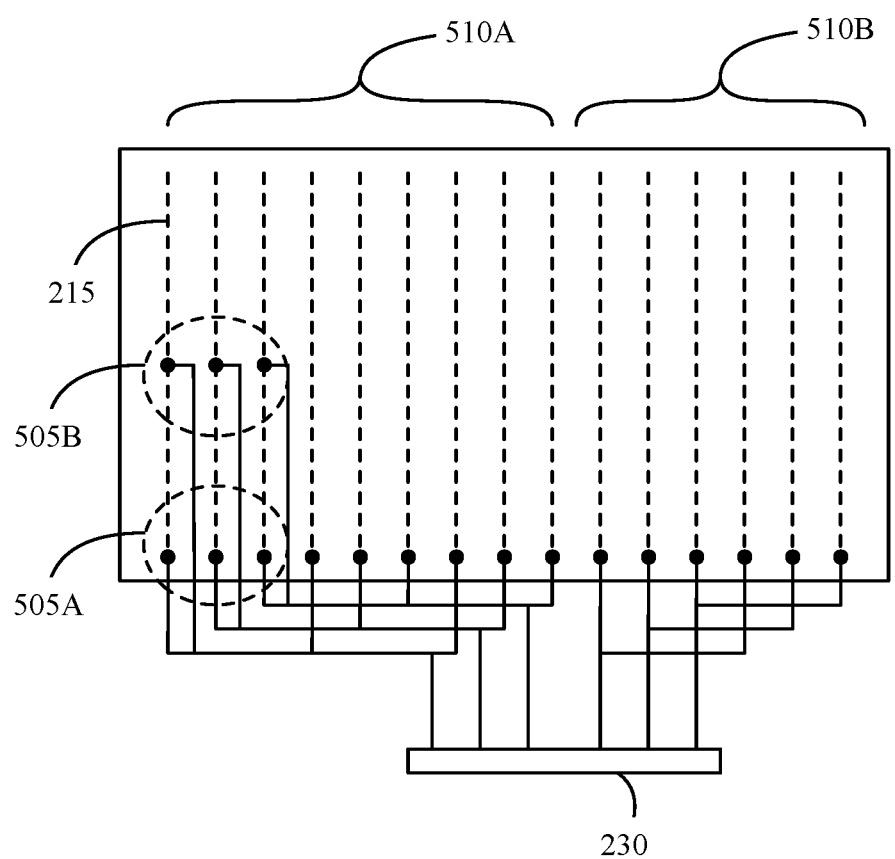
FIG. 5 is a schematic showing various arrangements of conductive-fibers of the covering, in accordance with an example.

FIG. 5 is a schematic showing various example arrangements of the conductive-fibers 215 within the outer material 205. Referring to the figure, a given conductive-fiber 215 or group of conductive-fibers 215 are electrically coupled to a particular output node or nodes of the signal conditioning circuitry 230 at multiple positions along its lengths. For example, the outputs of the signal conditioning circuitry 230 are coupled to the conductive-fibers 215 at a first end 505A and in a midpoint region 505B. This arrangement is beneficial where the covering 100 is expected to undergo wear and tear, which can stress and eventually cause the conductive-fibers 215 to open (e.g., become electrically disconnected from the output of the signal conditioning circuitry 230). The wear and tear can ultimately lead to a reduction in the dust repelling capabilities of the covering 100. This problem is mitigated to an extent by providing redundant circuit paths between the signal conditioning circuitry 230 and the conductive-fibers 215. In this case, if, for example, the conductive-fibers 215 were to sever between the first end 505A and the midpoint region 505B. The connection at the midpoint region 505B continues to provide voltage to the section of the conductive-fiber 215 that is cut off from the connection at the first end 505A. The outputs of the signal conditioning circuitry 230 are electrically coupled to additional regions to provide additional redundancy.

In another example, the plurality of conductive-fibers 215 are arranged in different dust repelling groups (510A, 510B). This facilitates selectively applying, by the signal conditioning circuitry 230, voltages to the dust repelling groups (510A, 510B) to selectively repel dust from different regions of the outer material 205. For example, in an example, a first dust-repelling group 510A of conductive-fibers 215 and a second dust-repelling group 510B of conductive-fibers 215 are arranged respectively on different sides of the covering 100 (e.g., topside, and sidewall). This facilitates limiting dust repelling to particular sides of the covering 100. For example, in an example, dust repelling is activated more frequently in areas of the covering 100 that are prone to collecting dust, such as the topside of the covering 100, and less frequently in those areas that are less likely to accumulate dust such as the sidewalls. Limiting the dust repelling operations reduces the amount of energy required to efficiently repel dust from the covering 100.

While the groups of conductive-fibers 215 are illustrated as extending in the same direction, other configurations are contemplated. For example, in an example, groups of conductive-fibers 215 are concentrically arranged on the covering 100. In another example, a first group of conductive-fibers 215 are arranged near the periphery of the covering 100, and another group of conductive-fibers 215 are arranged near the center of the covering 100. In some examples, the conductive-fibers 215 are arranged in different orientations. For example, in an example, a first group of conductive-fibers 215 extends perpendicularly across with outer material 205 in relation to a section group of conductive-fibers 215.

Figure 6A:
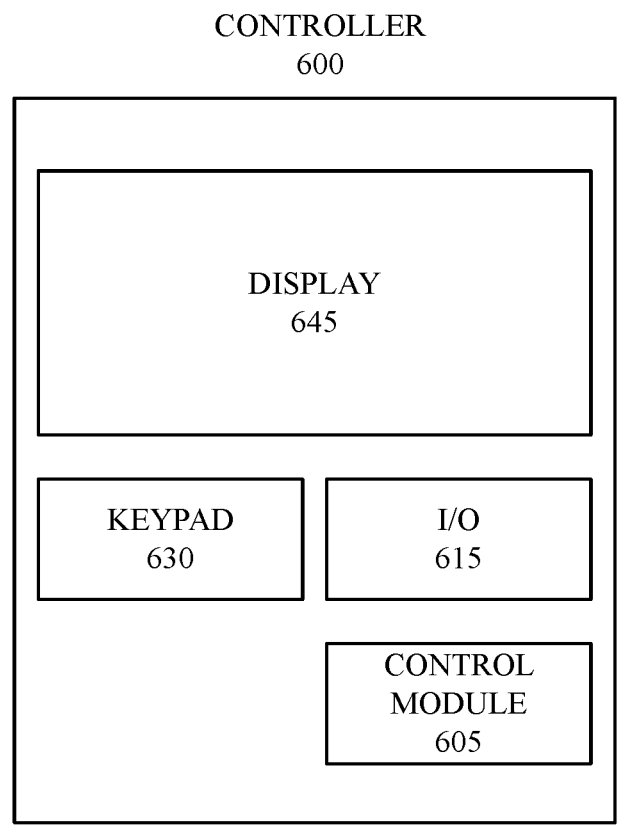
FIG. 6A illustrates a controller that facilitates controlling aspects of the covering, in accordance with an example.

FIG. 6A illustrates an example of a controller 600 that facilitates controlling the aspects of the covering 100. An example of the controller 600 includes a control module 505, an input/output (I/O) subsystem 615, a display 345, and a keypad 630. An example of the controller 600 includes other hardware and/or circuitry.

An example of the control module 605 includes a processor and a memory that stores instruction code executable by the processor to facilitate performing various operations for controlling the operation of the signal conditioning circuitry 230. An example of the processor corresponds to a stand-alone computer system such as an Intel®, AMD®, or PowerPC® based computer system or a different computer system and includes application-specific computer systems. An example of the computer system includes an operating system, such as Microsoft Windows®, Linux, Unix®, Apple IOS®, Android®, or a different operating system.

Within examples, operations performed or facilitated by the processor include activating/deactivating dust repelling capabilities of the covering 100 or different dust repelling groups of the covering 100 and/or specifying a schedule for activating dust repelling capabilities of the covering 100 or the dust repelling groups of the covering 100. Other operations facilitate monitoring dust repelling performance of the covering 100, such as whether any conductive-fibers 215 are broken/open. In some examples, the operations include specification of the voltage and/or frequency to apply to the conductive-fibers 215 of the covering 100. Other operations described in additional detail below can be performed by the controller 600.

An example of the I/O subsystem 615 includes one or more input/output interfaces configured to facilitate communications with entities outside of the controller 600. For example, an example of the I/O subsystem 615 includes an I2C interface that facilitates communicating I2C based instructions to the signal conditioning circuitry 230. Examples of the instructions facilitate activating/deactivating dust repelling capabilities of the signal conditioning circuitry 230, monitoring the performance of the signal conditioning circuitry 230, specifying the voltages and/or frequency of the signals output from the signal conditioning circuitry 230, etc. In some examples, the I/O subsystem 615 includes wireless circuitry (e.g., Bluetooth®) that communicates with corresponding wireless communication circuitry 232 that is included with or in communication with the signal conditioning circuitry 230 to control operations of the signal conditioning circuitry 230 wirelessly.

Another example of the I/O subsystem 615 facilitates communicating information to a remote system. For example, an example of the I/O subsystem 615 includes a wired or wireless interface that facilitates communicating information from a lunar module. An example of the wired interface corresponds to an RS232 port, universal serial bus (USB) port, etc. An example of the wireless interface facilitates communicating information in the gigahertz range or in a different band. An example of the wireless interface facilitates communicating information using any number of wireless broadband communication standards, such as the Institute of Electrical and Electronics Engineering (IEEE) standards 802.11, 802.12, 802.16 (WiMAX), 802.20, cellular telephone standards, or other communication standards.

An example of the display 645 corresponds to a liquid crystal display (LCD), a light-emitting diode (LED) display, or a different type of display. An example of the display 645 is ruggedized to facilitate operation in extreme environments, such as operation on a moon, planetoid, etc. An example of the keypad 630 corresponds to a QWERTY keypad, numeric keypad, etc. In an example, each key of the keypad 630 corresponds to a mechanical switch, a capacitive switch, etc. In some examples, the display 645 is a touch-sensitive display, and operations facilitated by the keypad are performed via the touch-sensitive display.

Figure 6B:
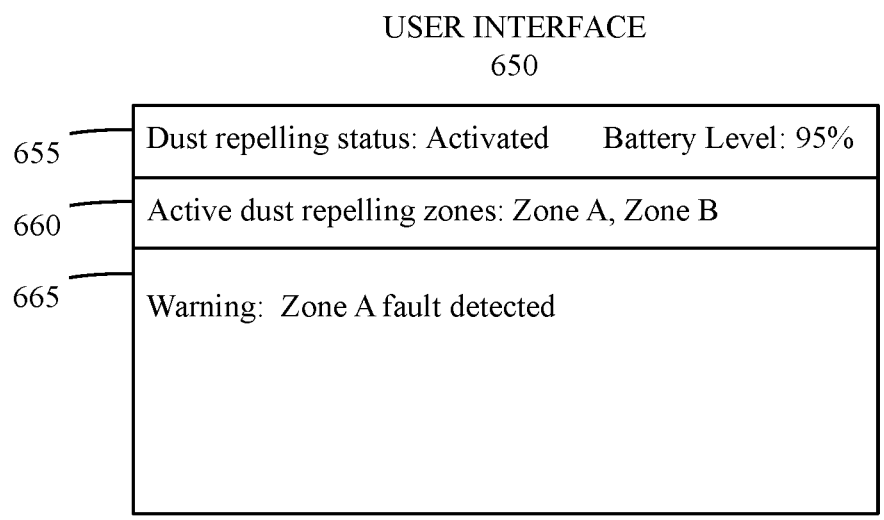
FIG. 6B illustrates a user interface that is generated by the controller, in accordance with an example.

FIG. 6B illustrates an example of a user interface 650 that is generated by the controller 600. Referring to the figure, an example of the user interface 650 includes a first control region 655 that depicts information such as whether dust repelling operations of the covering 100 are active. A battery status indicator (e.g., 95% battery life) is indicated in the first control region 655. The second control region 660 specifies information such as a listing of dust repelling zones of the covering 100 that are active. A third control region 665 specifies other information such as warnings related to any faults that are detected. In other examples, other information, such as the voltage and/or frequency being generated by the signal conditioning circuitry 230 is depicted. In an example, the user interface 650 is updated to facilitate specification of any of the settings described above (i.e., schedules, voltages, frequencies, etc.)

In some examples, the controller 600 is attached to an outside surface of the covering 100. An example of the controller 600 is in wired or wireless communication with the signal conditioning circuitry 230. In some examples, the display 645 and/or keypad is arranged on the outside surface of the covering 100, and the other subsystems of the controller 600 are arranged within the interior of the covering 100. In some examples, the covering 100 includes a pocket for storing the controller 600.

Figure 7:
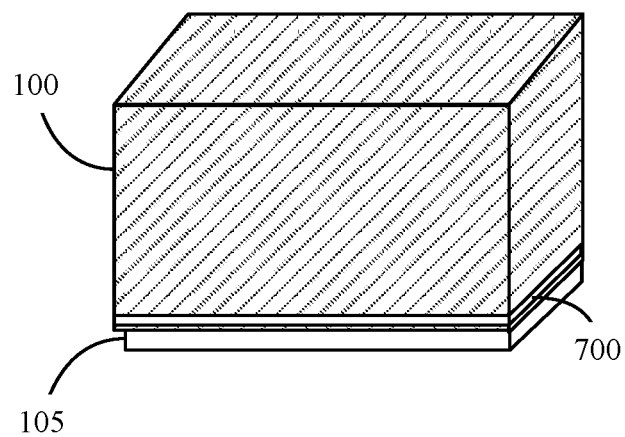
FIG. 7 illustrates a covering with an integrated elastic band, in accordance with an example.

FIG. 7 illustrates an example of a covering 100 with an integrated elastic band 700. In an example, the elastic band 700 is arranged around a periphery of the outer material 205 and facilitates encasing an article 105 with the covering 100. For example, the covering 100, in this case, is wrapped around the article 105. The elastic band 700 is stretchable to at least a suitable dimension of the article 105 to facilitate pulling the covering 100 over the article 105 and is then releasable after the article 105 is fully or partially contained within the covering 100. When released, the covering 100 encapsulates the article 105 in a secure manner (i.e., so that it will not unduly come off).

Figure 8:
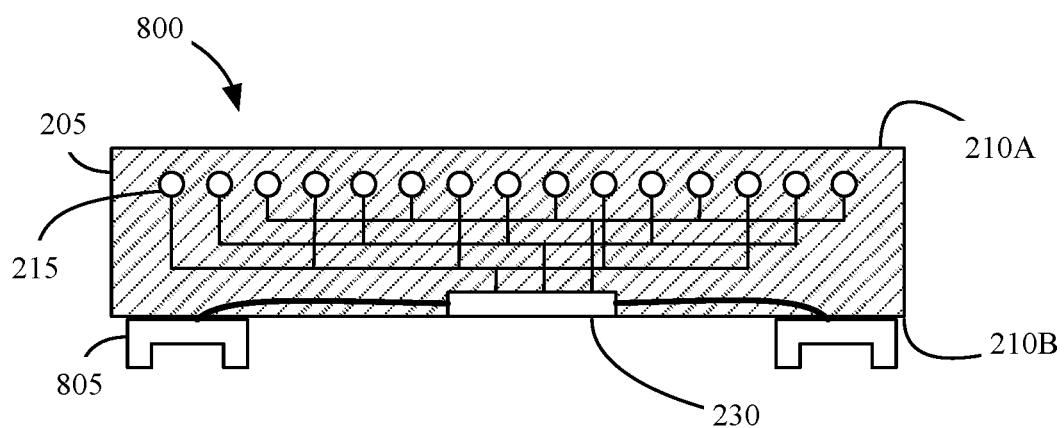
FIG. 8 illustrates a cross-section of a covering that includes button-snaps to attach the covering to an article, in accordance with an example.

FIG. 8 illustrates an example of a cross-section of a covering 800 that includes button-snaps to attach the covering 100 to an article 105. Referring to the figures, the covering 100 includes an outer material 205, a plurality of conductive-fibers 215, and one or more button-snaps 805. The outer material 205 includes a front surface 210A and a back surface 210B, and the conductive-fibers 215 are disposed between the front surface 210A and the back surface 210B. The conductive-fibers 215 are configured to receive a voltage that causes the conductive-fibers 215 to repel and remove dust from the front surface 210A of the outer material 205. The button-snaps 805 are coupled to the outer material 205 and facilitate releasably attaching the outer material 205 to an article 105.

In an example, the button snaps are arranged around the periphery of the covering 100. In an example, the button-snaps 805 are spaced apart from one another by, for example, five inches. The spacing is selectable depending on the size of the article 105.

In an example, two or more of the button-snaps 805 are electrically coupled to the signal conditioning circuitry 230 to provide power to the signal conditioning circuitry 230. These button-snaps 805 are coupled to corresponding button-snaps on an article 105 to be covered from which power is received. In some examples, these button-snaps 805 are keyed so that they are only couplable to a particular pair of button-snaps on the article 105.

Figure 9:
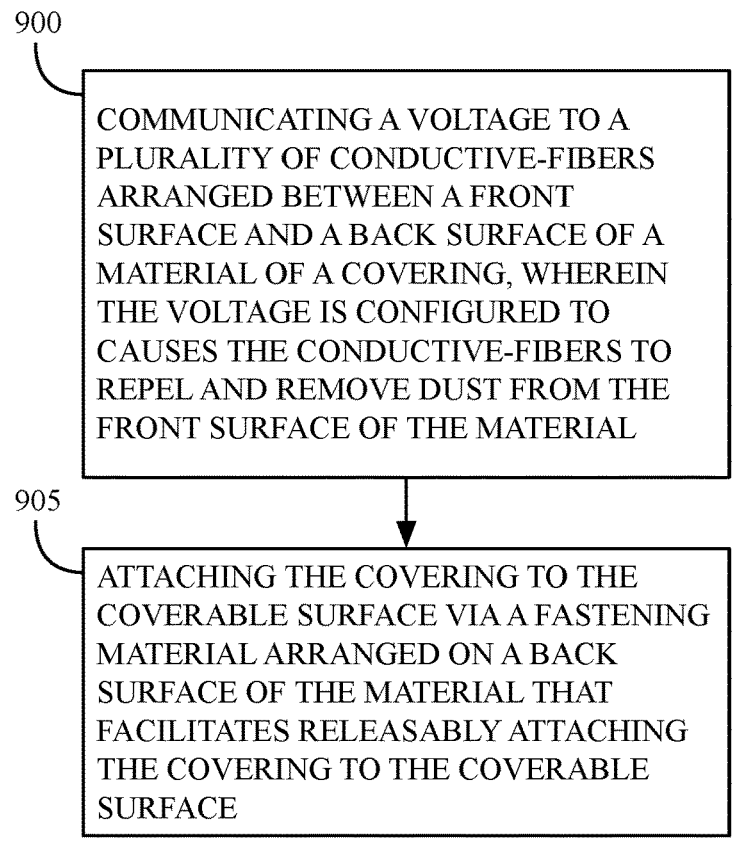
FIG. 9 illustrates a method that is implemented in connection with and/or involves the covering described above, in accordance with an example.

FIG. 9 illustrates a method that is implemented in connection with and/or involves the covering 100 described above. Block 900 involves communicating a voltage to a plurality of conductive-fibers 215 arranged between a front surface 210A and a back surface 210B of an outer material 205 of a covering 100, wherein the voltage is configured to causes the conductive-fibers 215 to repel and remove dust from the front surface 210A of the outer material 205.

Block 905 involves attaching the covering 100 to the article 105 via a fastening material 220 arranged on a back surface 210B of the outer material 205 that facilitates releasably attaching the covering 100 to the article 105.

In an example, the fastening material 220 comprises a first pair of electrical contacts 225 configured to electrically couple to a second pair of electrical contacts 225 arranged on the article 105. The second pair of electrical contacts 225 are in electrical communication with a power source 109, and the voltage is derived from the power source 109. In this example, attaching the covering 100 to the article 105 involves coupling the first pair of electrical contacts 225 to the second pair of electrical contacts 225.

An example involves generating, by signal conditioning circuitry 230 in electrical communication with the plurality of conductive-fibers 215, an alternating-current (AC) voltage that has a voltage of between 200 volts and 2000 volts and a frequency of between 5 Hz and 100 Hz that facilitates repelling from the covering 100 dust particles having sizes between about 5 and 300 microns.

An example involves determining, by the signal conditioning circuitry 230, a load associated with the plurality of conductive-fibers 215 to facilitate detection of damage to the conductive-fibers 215.

An example involves indicating, by a status indicator in communication with the signal conditioning circuitry 230, an amount of damage detected by the signal conditioning circuitry 230.

In an example, the plurality of conductive-fibers 215 are arranged in different dust repelling groups (510A, 510B). This example involves selectively applying, by the signal conditioning circuitry 230, voltage to the different dust repelling groups (510A, 510B) to selectively repel dust from different regions of the outer material 205.

An example involves specifying one or more dust repelling groups (510A, 510B) of conductive-fibers 215 to which voltage is to be applied via a user interface 650 in communication with the signal conditioning circuitry 230.

An example involves wirelessly receiving, via wireless communication circuitry 232 in communication with the signal conditioning circuitry 230, an instruction that specifies one or more dust repelling groups (510A, 510B) of conductive-fibers 215 to which voltage is to be applied.

An example involves deriving voltage to be applied to the conductive-fibers 215 from a photovoltaic system 315.

An example involves deriving voltage to be applied to the conductive-fibers 215 from an integrated power source 305.

An example involves wirelessly recharging the integrated power source 305 via wireless charging circuitry 310 in communication with the integrated power source 305.

Figure 10:
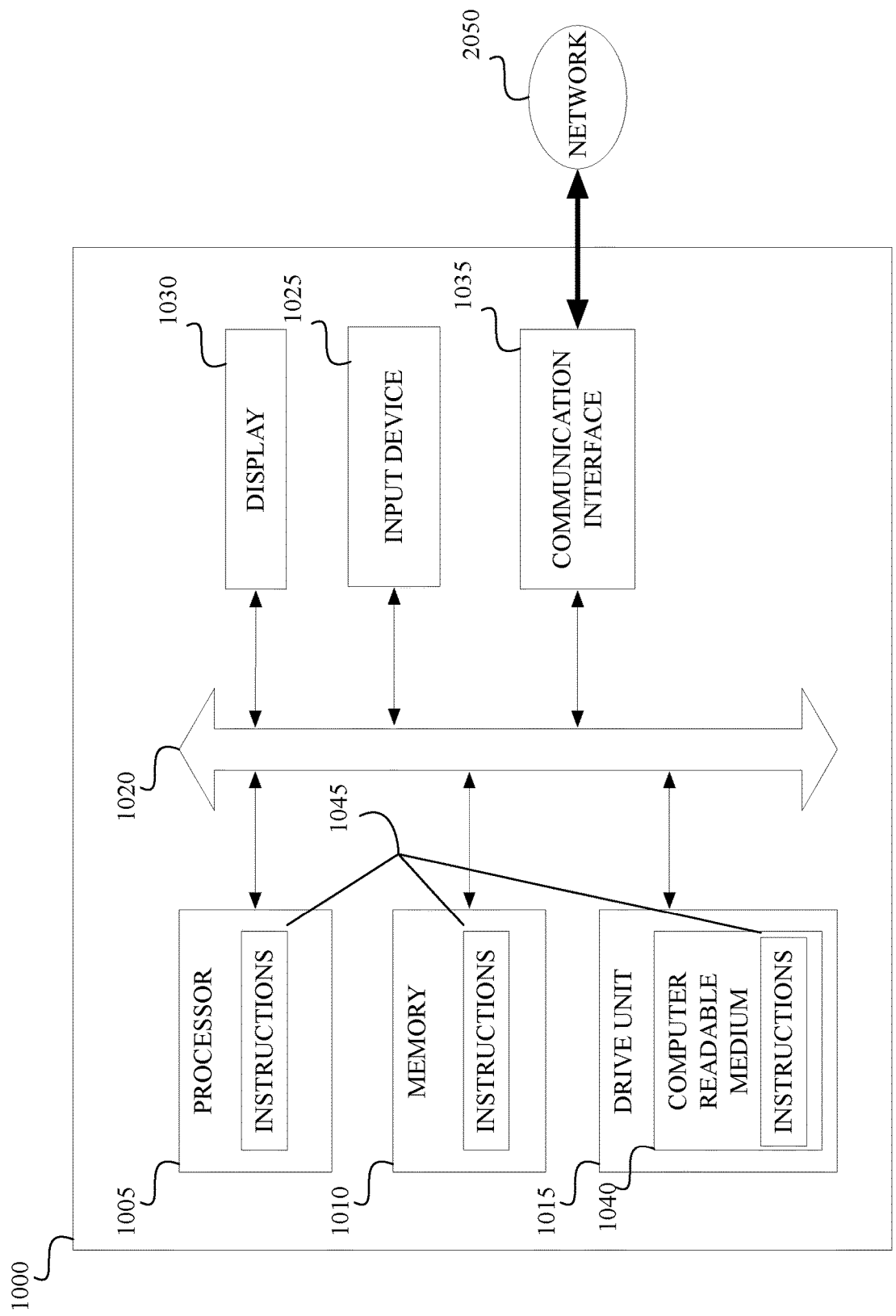
FIG. 10 illustrates a computer system that forms part of or implements any of the systems or devices of the environment, in accordance with an example.

FIG. 10 illustrates an example of a computer system 1000 that can form part of or implement any of the systems and/or devices described above. An example of the computer system 1000 includes a set of instructions 1045 that the processor 1005 executes to cause the computer system 1000 to perform any of the operations described above. An example of the computer system 1000 operates as a stand-alone device or is connected, e.g., using a network, to other computer systems or peripheral devices.

In a networked example, an example of the computer system 1000 operates in the capacity of a server or as a client computer in a server-client network environment, or as a peer computer system in a peer-to-peer (or distributed) environment. An example of the computer system 1000 is implemented as or incorporated into various devices, such as a personal computer or a mobile device, capable of executing instructions 1045 (sequential or otherwise), causing a device to perform one or more actions. Further, in some examples, each of the systems described includes a collection of subsystems that individually or jointly execute a set, or multiple sets, of instructions to perform one or more computer operations.

An example of the computer system 1000 includes one or more memory devices 1010 communicatively coupled to a bus 1020 for communicating information. In an example, code operable to cause the computer system to perform operations described above is stored in the memory devices 1010. An example of the memory devices 1010 is a random-access memory, read-only memory, programmable memory, hard disk drive, or any other type of memory or storage device.

An example of the computer system 1000 includes a display 1030, such as a liquid crystal display (LCD), a cathode ray tube (CRT), or any other display suitable for conveying information. An example of the display 1030 acts as an interface for the user to see processing results produced by processor 1005.

Additionally, an example of the computer system 1000 includes an input device 1025, such as a keyboard or mouse or touchscreen, configured to allow a user to interact with components of system 1000.

An example of the computer system 1000 includes a disk or optical drive unit 1015. An example of the drive unit 1015 includes a computer-readable medium 1040 in which the instructions 1045 are stored. An example of the instructions 1045 resides completely, or at least partially, within the memory devices 1010 and/or within the processor 1005 during execution by the computer system 1000. An example of the memory devices 1010 and the processor 1005 include computer-readable media as discussed above.

An example of the computer system 1000 includes a communication interface 1035 to support communications via a network 1050. An example of the network 1050 includes wired networks, wireless networks, or combinations thereof. An example of the communication interface 1035 enables communications via any number of communication standards, such as 802.11, 802.12, 802.20, WiMAX, cellular telephone standards, or other communication standards.

Accordingly, examples of methods and systems described herein are realizable in hardware, software, or a combination of hardware and software. Examples of the methods and systems are realizable in a centralized fashion in at least one computer system or in a distributed fashion where different elements are spread across interconnected computer systems. Any kind of computer system or other apparatus adapted for carrying out the methods described herein can be employed.

The methods and systems described herein can also be embedded in a computer program product, which includes all the features enabling the implementation of the operations described herein and which, when loaded in a computer system, can carry out these operations. Computer program as used herein refers to an expression, in a machine-executable language, code or notation, of a set of machine-executable instructions intended to cause a device to perform a particular function, either directly or after one or more of a) conversion of a first language, code, or notation to another language, code, or notation; and b) reproduction of a first language, code, or notation.

II. CONCLUSION

While various systems and methods of operation have been described with reference to certain examples, it will be understood by those skilled in the art that various changes can be made and equivalents can be substituted without departing from the scope of the claims. Therefore, it is intended that the present methods and systems not be limited to the particular example disclosed, but that the disclosed methods and systems include all embodiments falling within the scope of the appended claims.

The invention claimed is:

1. A covering comprising:
    an outer material having a front surface and a back surface;
    a plurality of conductive-fibers disposed between the front surface and the back surface, wherein the plurality of conductive-fibers are configured to receive a voltage that causes the conductive-fibers to repel and remove dust from the front surface of the outer material;
    signal conditioning circuitry to generate the voltage, wherein the signal conditioning circuitry includes outputs that generate time-varying voltages of different phases, wherein the voltages of different phases are applied to adjacent conductive-fibers by the signal conditioning circuitry such that a first voltage output is coupled to a first set of conductive fibers and a second different voltage output is coupled to a second set of conducive fibers;
    a fastening material coupled to the back surface of the outer material that facilitates releasably attaching the outer material to an article; and
    a status indicator in communication with the signal conditioning circuitry, wherein the status indicator is configured to indicate an amount of damage to or usable percentage of conductive-fibers detected by the signal conditioning circuitry.

2. The covering according to claim 1, wherein the fastening material corresponds to an adhesive.

3. The covering according to claim 1, wherein the fastening material corresponds to a hook-and-loop material that is configured to attach to a hook-and-loop material disposed on the article.

4. The covering according to claim 1, further comprising a first pair of electrical contacts configured to electrically couple to a second pair of electrical contacts, which are arranged on the article, when the covering is attached to the article, wherein the second pair of electrical contacts are in electrical communication with a power source, and the voltage is derived from the power source.

5. The covering according to claim 1, wherein the voltage generated by the signal conditioning circuitry corresponds to an alternating-current (AC) voltage that has a voltage of between 200 volts and 2000 volts and a frequency of between 5 Hz and 100 Hz.

6. The covering according to claim 5, wherein the voltage generated by the signal conditioning circuitry is one of: a sinusoidal voltage or a square wave voltage.

7. The covering according to claim 1, wherein the signal conditioning circuitry is configured to determine a load associated with the plurality of conductive-fibers to facilitate detection of damage to the conductive-fibers.

8. The covering according to claim 5, wherein the plurality of conductive-fibers are arranged in different dust repelling groups, wherein the signal conditioning circuitry is configured to selectively apply voltage to the different dust repelling groups to selectively repel dust from different regions of the outer material.

9. The covering according to claim 8, further comprising a user interface in communication with the signal conditioning circuitry that facilitates specification of one or more dust repelling groups of conductive-fibers to which voltage is to be applied.

10. The covering according to claim 8, further comprising wireless communication circuitry in communication with the signal conditioning circuitry configured to wirelessly receive an instruction that specifies one or more dust repelling groups of conductive-fibers to which voltage is to be applied.

11. The covering according to claim 1, further comprising an elastic band arranged around a periphery of the outer material that facilitates encasing the article within the covering.

12. The covering according to claim 1, further comprising a photovoltaic system configured to generate power from which the voltage is derived.

13. The covering according to claim 1, further comprising an integrated power source configured to generate power from which the voltage is derived.

14. The covering according to claim 13, further comprising wireless charging circuitry that facilitates wirelessly recharging the integrated power source.

15. A covering comprising:
an outer material having a front surface and a back surface;
a plurality of conductive-fibers disposed between the front surface and the back surface, wherein the plurality of conductive-fibers are configured to receive a voltage that causes the conductive-fibers to repel dust from the front surface of the outer material;
one or more button-snaps coupled to the outer material that facilitate releasably attaching the outer material to an article;
signal conditioning circuitry to generate the voltage, wherein the signal conditioning circuitry includes outputs that generate time-varying voltages of different phases, wherein the voltages of different phases are applied to adjacent conductive-fibers by the signal conditioning circuitry such that a first voltage output is coupled to a first set of conductive fibers and a second different voltage output is coupled to a second set of conducive fibers, wherein the plurality of conductive-fibers are arranged in different dust repelling groups and wherein the signal conditioning circuitry is configured to selectively apply voltage to the different dust repelling groups to selectively repel dust from different regions of the outer material; and
a user interface in communication with the signal conditioning circuitry that facilitates specification of one or more dust repelling groups of conductive-fibers to which voltage is to be applied.

16. A method for repelling dust from an article, the method comprising:
generating time-varying voltages of different phases;
communicating time-varying voltages of different phases at 120 degrees out-of-phase with one another to a plurality of conductive-fibers arranged between a front surface and a back surface of an outer material of a covering, wherein the time-varying voltages of different phases are configured to cause the conductive-fibers to repel and remove dust from the front surface of the outer material, wherein the time-varying voltages of different phases include a first output voltage, a second output voltage, and a third output voltage, and the first output voltage is 120 degrees out of phase with the second voltage, the second voltage is 120 degrees out of phase with the third output voltage, and the third output voltage is 120 degrees out of phase with the first output voltage, wherein the time-varying voltages of different phases are applied to adjacent conductive-fibers such that the first output voltage, the second output voltage, and the third output voltage are respectively coupled one of every third adjacent conductive-fiber of the plurality of conductive-fibers; and
attaching the covering to the article via a fastening material arranged on a back surface of the outer material that facilitates releasably attaching the covering to the article.

17. The method according to claim 16, wherein the fastening material comprises a first pair of electrical contacts configured to electrically couple to a second pair of electrical contacts arranged on the article, wherein the second pair of electrical contacts are in electrical communication with a power source, and the voltage is derived from the power source wherein attaching the covering to the article further comprises, coupling the first pair of electrical contacts to the second pair of electrical contacts.

18. The method according to claim 16, wherein generating the time-varying voltages of different phases comprises:
generating, by signal conditioning circuitry in electrical communication with the plurality of conductive-fibers, an alternating-current (AC) voltage that has a voltage of between 200 volts and 2000 volts and a frequency of between 5 Hz and 100 Hz that facilitates repelling, from the covering, dust particles having sizes between about 5 and 300 microns.

19. The covering according to claim 1, wherein the voltages of different phases are 120 degrees out-of-phase with one another.

20. The covering according to claim 19, wherein:
the voltages of different phases include a first output voltage, a second output voltage, and a third output voltage, and
the first output voltage is 120 degrees out of phase with the second voltage, the second voltage is 120 degrees out of phase with the third output voltage, and the third output voltage is 120 degrees out of phase with the first output voltage.

21. The covering according to claim 20, wherein the first output voltage, the second output voltage, and the third output voltage are respectively coupled one of every third adjacent conductive-fiber of the plurality of conductive-fibers.

* * * * *